May 12, 1936.  C. E. PRINCE  2,040,103
EDDY CURRENT MINIMIZER
Filed July 7, 1934   2 Sheets-Sheet 1

INVENTOR
Charles E. Prince
BY
Harold Dodd
ATTORNEY

May 12, 1936.  C. E. PRINCE  2,040,103
EDDY CURRENT MINIMIZER
Filed July 7, 1934　　2 Sheets-Sheet 2
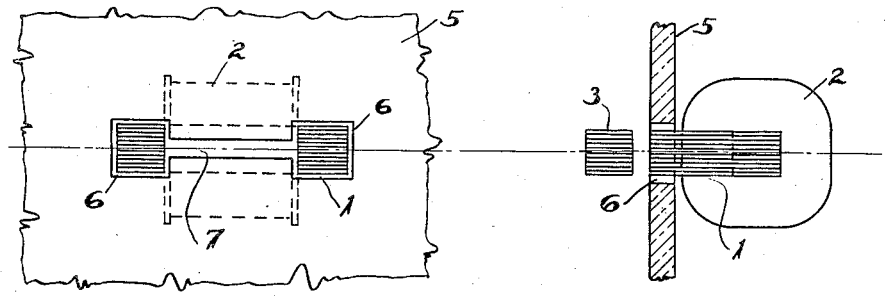
Fig_6　　Fig_7
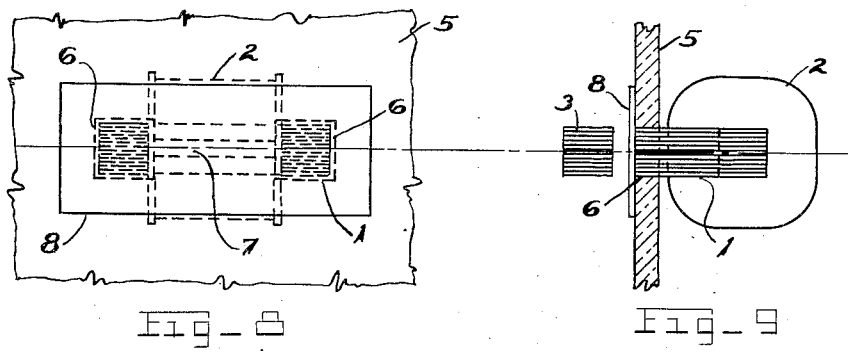
Fig_8　　Fig_9
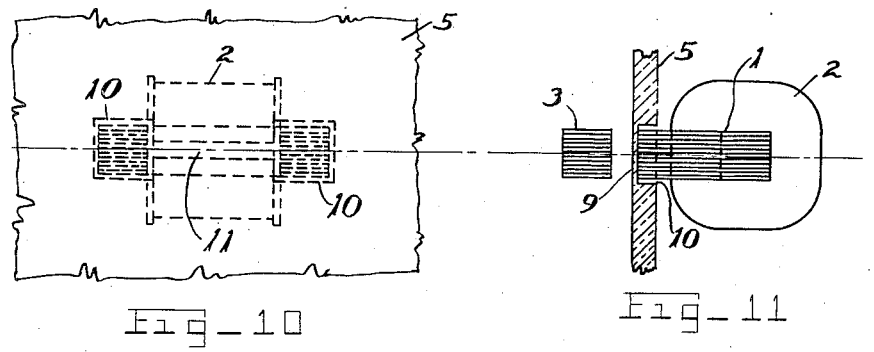
Fig_10　　Fig_11
INVENTOR
Charles E. Prince
BY
ATTORNEY Patented May 12, 1936

2,040,103

UNITED STATES PATENT OFFICE 2,040,103

EDDY CURRENT MINIMIZER

Charles E. Prince, Kittery, Maine

Application July 7, 1934, Serial No. 734,226

2 Claims. (Cl. 175—338)

(Granted under the act of March 3, 1883, as amended April 30, 1928; 370 O. G. 757)

This invention relates to a method of and means for the suppression of excessive eddy current generation in special applications of alternating current electromagnets and of pulsating direct current electromagnets. Where an alternating current energized, or interrupted direct current energized, or pulsating current energized electromagnet is enclosed inside of a gas or water-tight casing of non-magnetic metal, or where the electromagnet is disposed on one side of a non-magnetic metal wall or partition and its armature is on the outside of said casing or on the other side of said wall or partition from the electromagnet, as for instance in certain types of bells, buzzers and the like, it has been found that normally the eddy current losses due to the eddy currents induced in said wall are considerable.

The principal object of this invention is, therefore, to provide practical means for employing an alternating current, a periodically interrupted, or a pulsating direct current electromagnet in such applications as require that its core and coil winding shall be mounted on one side of a non-magnetic metal wall or partition and its armature located and operative on the opposite side of said wall or partition, said wall or partition being proof against the flow or leakage through it of gases or fluids, such application of the electromagnet to be accomplished in a manner that suppresses the generation of excessive eddy currents in said metal wall or partition.

Given a non-magnetic metal wall or partition or a non-magnetic metal enclosure of such substantial thickness as may be structurally suitable for supporting or housing a given electromagnet assembly, or as may be suitable for completely preventing the flow or leakage through it of gases or fluids, the following is descriptive of the arrangements which constitute the invention.

In a first embodiment of the invention the metal wall, partition or enclosure is pierced by holes sufficiently large and so located as to admit the poles of the electromagnet, and these holes are joined by a slot which also pierces the metal wall, partition or enclosure. The electromagnet assembly is secured one one side of the metal wall or partition, or within the metal enclosure so that its pole end surfaces are flush with the surface of the opposite side of the wall or partition or outside surface of the casing. A diaphragm of thin metal, preferably non-magnetic, or of other thin durable substance, is soldered, brazed, welded or otherwise secured to the surface of the wall, partition or enclosure which is opposite the electromagnet assembly, entirely covering the holes and slot which pierce the wall, partition or enclosure, and in a manner such as to form a seal to completely prevent the flow or leakage of gases or fluids through these openings in the wall. Separated from the poles of the electromagnet only by its working air gap and the thickness of the diaphragm the armature is located and operative on the side of the wall which is opposite the electromagnet assembly.

In a slightly different embodiment of the invention the metal wall, partition or enclosure is recessed by a depression produced by casting, die-casting, machining or other process and consisting of elements shaped for the admission of each pole of the electromagnet and joined by an element in the form of a slot or slots, the depth of the depression being uniform and of such depth as to leave remaining but a thin portion of the metal wall below the depression. The electromagnet assembly is secured so that its poles are in close contact with the bottom of the depression in the metal wall, partition or enclosure. Separated from the poles of the electromagnet only by its working air gap and the thickness of the metal wall remaining below the depression, the armature is located and operative on the side of the wall which is opposite the electromagnet assembly.

The operation of the invention will be explained in greater detail in connection with the accompanying drawings, in which.

Figure 2:
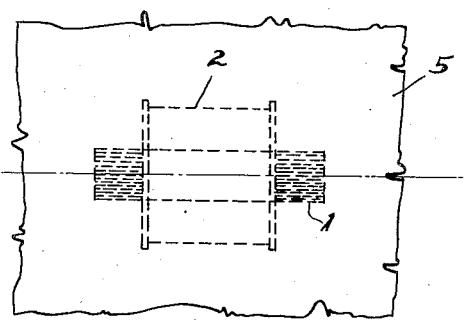
Fig. 2 is a view of the electromagnet and wall shown in Fig. 1 made at an angle of 90° with respect thereto, with the armature 3 omitted for clearness.
Figure 3:
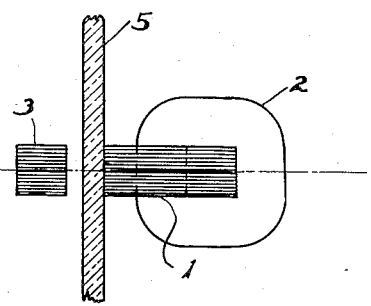
Fig. 3 is a further view of the device partially in section made at angles of 90° with respect to Figs. 1 and 2.
Figure 4:
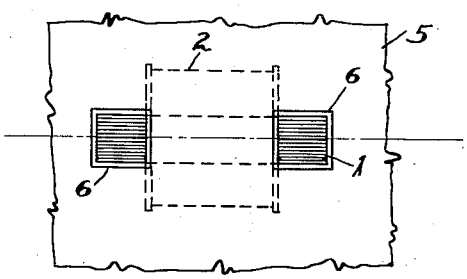
Figure 5:
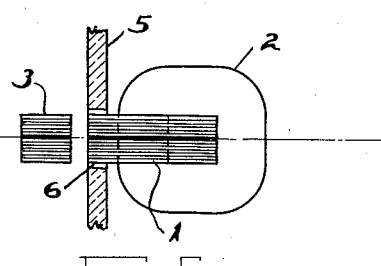

Figs. 4 and 5 are views corresponding respectively to Figs. 2 and 3 but in which the electromagnet core 1 extends through openings in the wall or partition;

Figs. 6 and 7 are views corresponding respectively to Figs. 4 and 5 but in which the opening 7 extends between the openings 6;

Figs. 8 and 9 are views corresponding respectively to Figs. 6 and 7 but in which the openings 6 and 7 are covered with a thin plate or diaphragm 8;

Figs. 10 and 11 are views corresponding respectively to Figs. 8 and 9 but in which a portion of the original wall or partition is used in lieu of the thin plate or diaphragm 8 in Figs. 8 and 9.

Figure 1:
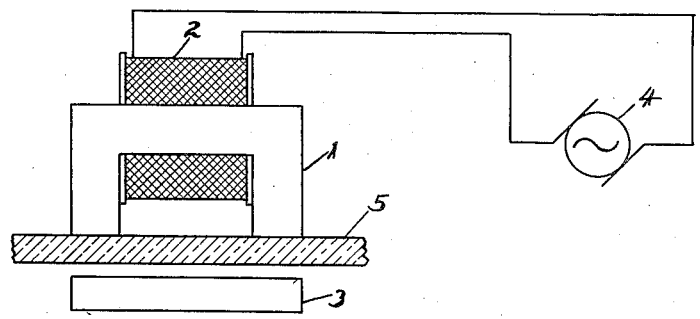
Fig. 1 is a diagrammatic view partially in section of an electromagnet having an armature located on the opposite side of a wall or partition opposite the poles of said electromagnet.

In each of the figures, 1 represents the core of an alternating current, periodically interrupted or pulsating direct current electromagnet; 2 its coil winding; 3 its armature; 4 the given source of electrical excitation—an alternating current generator or a periodically interrupted or pulsating source of direct current; 5 is a non-magnetic metal wall or partition or some part of a non-magnetic metal casing which will be referred to hereinafter as a "metal wall". The electromagnet assembly and the electrical circuit indicated by 1, 2, 3 and 4 in Fig. 1 is assumed to apply also to Figs. 2, 3, 4, 5, 6, 7, 8, 9, 10 and 11. In Figs. 2, 4, 6, 8 and 10 the armature 3 is omitted in these views in order to avoid confusion in illustrating the development of the principle. Figs. 10 and 11 illustrate the arrangement of apparatus when a depression is recessed into the metal wall and the electromagnet is secured so that its poles are in close contact with the bottom of the depression, the remaining wall thickness 9 below the depression being the equivalent of diaphragm 8 of Figs. 8 and 9, and the elements 10 and 11 of the depression corresponding respectively to holes 6 and slot 7 of Figs. 8 and 9.

In Figs. 1, 2 and 3 the electromagnet assembly is shown mounted so that the pole surfaces of its core are in close contact with the metal wall 5 which separates them from the armature 3. This arrangement introduces an equivalent air gap in the magnetic circuit equal to the thickness of metal wall 5 in excess of the working air gap which ordinarily so reduces the useful range and intensity of action of the armature 3 for the given electrical excitation as to render the arrangement impractical and undesirable because of its poor efficiency. In order to obtain increased efficiency it is necessary to devise some means which allows the armature 5 to function in closer proximity to the pole surfaces of magnet core 1 without destroying the sealing property or other purpose of metal wall 5 and which accomplishes this in a manner that reduces the generation of eddy currents in metal wall 5.

In Figs. 4 and 5, holes 6 have been cut through the metal wall 5 and the poles of the magnet core 1 are admitted through these holes so that they are flush with the opposite surface of the wall. The equivalent air gap, equal to the thickness of metal wall 5 which exists in Figs. 1, 2 and 3 has been eliminated and the useful range and intensity of action of the armature 3 is, therefore, accordingly increased. But with this arrangement the metal wall 5 surrounding the poles of magnet core 1 becomes the equivalent of short-circuited turns of low resistance around each leg of the magnet core 1. As a consequence, at the given electrical excitation, the alternating, periodically interrupted or pulsating magnetic flux lines, increased in number by the improved magnetic path incidental to the reduced length of air gap, induce eddy currents of correspondingly increased intensity within the substance of the metal wall 5 which encircles the poles of magnet core 1. These eddy currents represent a waste or loss of energy. Furthermore, with the arrangement of Figs. 4 and 5 the purpose of the metal wall 5 is destroyed by the presence of the holes for the admission of poles of the magnet core 1.

In Figs. 6 and 7 the poles of magnet core 1 and the armature 3 are in the same position with relation to the metal wall 5 as in Figs. 4 and 5. But in Figs. 6 and 7 a slot 7 has been cut through the metal wall 5, joining the holes 6. With the given electrical excitation, generation of eddy currents in the metal wall 5 is reduced because the equivalent turns of low resistance which exist in Figs. 4 and 5 are open-circuited by the slot 7. The eddy current energy loss of Figs. 4 and 5 is therefore reduced in Figs. 6 and 7, but, as in Figs. 4 and 5, the presence of the openings in the metal wall 5 is destructive of its purpose.

In Figs. 8 and 9 the poles of the magnet core and armature 3 remain in the same position in relation to the metal wall 5 as in Figs. 4, 5, 6 and 7 and the metal wall 5 is pierced by the holes 6 and the slot 7 as in Figs. 6 and 7. A diaphragm 8 of thin metal or other thin durable substance is soldered, brazed or welded, or otherwise secured to the surface of metal wall 5 on the armature side of the wall entirely covering holes 6 and slot 7 and in a manner such as to form a seal to completely prevent the flow or leakage of fluids or gases through the openings in metal wall 5. In case the diaphragm 8 is a conductor of electricity, certain small values of eddy currents are induced in the substance of the diaphragm at the given electrical excitation. At the same time certain other small values of eddy currents are induced in the metal wall 5 which are roughly proportional to the combined conductance of the substance of metal wall 5 and the diaphragm 8 which spans the openings 6 and 7. The total energy loss due to eddy currents with the arrangement of Figs. 8 and 9 is, however, very greatly reduced and the method effectively accomplishes the reduction of eddy current generation.

For the given electrical excitation of the electromagnet the total generation of eddy currents in the metal wall 5 and diaphragm 8 in Figs. 8 and 9 is dependent on three principal factors, viz:

The conductivity of the material of diaphragm 8;

The conductivity of the material of metal wall 5;

The width of the slot 7 connecting the holes 6. In general, if the diaphragm 8 is an electrical conductor, it may be stated that the generation of eddy currents in a given metal wall 5 is directly proportional to the thickness of diaphragm 8 and inversely proportional to the width of slot 7. If diaphragm 8 is a non-conductor of electricity, the conductivity of metal wall 5 and the width of slot 7 are of no consequence since the electromagnet conditions are the same as in Figs. 6 and 7 and eddy current generation in metal wall 5 is the same as in Figs. 6 and 7.

The operation of the invention will be better understood in connection with the following tables of data based on actual tests showing the measured values of magnetizing current flowing in, the actual value of the energy supplied to, and the value of the $I^2R$ energy expended in the windings of a typical alternating current electromagnet excited under different conditions by an alternating potential of 115 volts at a frequency of 60 cycles per second:

TABLE I

| Test No | 1 | 2 | 3 | 4 |
|---|---|---|---|---|
| Arrangement of apparatus figures | 4 and 5 | 6 and 7 | 8 and 9 | 8 and 9 |
| Diaphragm | None | None | Brass | Fibre |
| Resistance of magnet winding ohms (R) | 80 | 80 | 80 | 80 |
| Magnetizing current in amperes (I) | .26 | .22 | .22 | .22 |
| Apparent watts input amperes×volts | 29.9 | 25.3 | 25.3 | 25.3 |
| Actual electrical energy input to magnet watts, by wattmeter (A) | 16.8 | 6.5 | 8.8 | 6.5 |
| Power factor | .562 | .257 | .348 | .257 |
| $I^2R$ energy expended in winding watts (B) | 5.4 | 3.88 | 3.88 | 3.88 |
| A minus B (A−B) | 11.40 | 2.62 | 4.92 | 2.62 |

TABLE II

*Comparison of energy consumption in Tests 2, 3 and 4 of Table I with Test 1 and arrangement of Figs. 4 and 5.*

| Test No. | Arrangement of apparatus | Reduction of total energy A | | Reduction of A−B energy | |
|---|---|---|---|---|---|
| | | Watts | Percentage | Watts | Percentage |
| 2 | Figs. 6 and 7 | 10.3 | 61.5 | 8.78 | 77 |
| 3 | Figs. 8 and 9 | 8.0 | 47.7 | 6.48 | 56.8 |
| 4 | Figs. 8 and 9 | 10.3 | 61.5 | 8.78 | 77 |

In practical applications of this invention in which an attached diaphragm is employed, the thickness of the diaphragm 8 and the width of the slot 7 are dependent on each other, on the circumstances of fluid or gaseous pressures to which the metal wall 5 is exposed in service, and to the capacity of the diaphragm 8 to resist these pressures. For example, with pressure equal on both sides of metal wall 5, the slot may be as wide as holes 6 which receive the magnet poles and the diaphragm 8 may be as thin as its mechanical strength will permit. On the other hand, with pressure against one side of metal wall 5 exceeding that on the other side, the width of slot 7 must be regulated to protect the diaphragm 8 against bulging or rupture incidental to differences of pressure.

In practical applications of this invention wherein the equivalent of a metal diaphragm is obtained by sinking a depression in the metal wall as illustrated in Figs. 10 and 11, the thickness 9 of the metal wall 5 below the depression and the width of the slot 11 of the depression are dependent upon each other, on the circumstances of fluid or gaseous pressures to which the metal wall 5 is exposed in service and to the capacity of the wall thickness 9 to resist these pressures, and the choice of proportions is dependent upon the same considerations as prevail in the application of the attached metal diaphragm.

The invention described herein may be manufactured and used by or for the Government of the United States of America for governmental purposes, without the payment of any royalties thereon.

I claim:

1. In combination, a variably excited electromagnet having a vibratory armature and a non-magnetic metal wall separating said electromagnet from its armature, said non-magnetic metal wall being provided with apertures for receiving the poles of said electromagnet and having a slot extending between said apertures, and a wall of lesser thickness than said non-magnetic metal wall covering said apertures and said slot.

2. In combination, a cyclically excited electromagnet having a vibratory armature and a conductive partition separating said electromagnet and said armature, said conductive partition being provided with apertures for receiving the poles of said electromagnet and having a slot extending between said apertures, and a gas and liquid-tight diaphragm of lesser thickness than said partition covering said slot and said apertures.

CHARLES E. PRINCE.